[19] United States Patent
Osman et al.

[11] Patent Number: 5,244,965
[45] Date of Patent: Sep. 14, 1993

[54] POLYMER SOLUTION TREATMENT PROCESS

[75] Inventors: Akhtar Osman; William G. Bradford, both of Sarnia, Canada

[73] Assignee: Polysar Limited, Sarnia, Canada

[21] Appl. No.: 368,155

[22] Filed: Jun. 14, 1989

Related U.S. Application Data

[63] Continuation of Ser. No. 145,406, Jan. 19, 1988, abandoned.

[51] Int. Cl.$^5$ .............................................. C08J 55/00
[52] U.S. Cl. .................................... 524/565; 525/338; 525/339; 528/491; 528/494
[58] Field of Search ................ 525/338, 339; 528/491, 528/494; 524/565

[56] References Cited

U.S. PATENT DOCUMENTS 4,464,515  8/1984  Rempel et al. .

FOREIGN PATENT DOCUMENTS 1558491  1/1980  United Kingdom .

Primary Examiner—Joseph L. Schofer
Assistant Examiner—Peter D. Mulcahy
Attorney, Agent, or Firm—Stevens, Davis, Miller & Mosher

[57] ABSTRACT

The present invention provides a process to remove phosphine residues from a hydrogenated polymer solution.

8 Claims, No Drawings

POLYMER SOLUTION TREATMENT PROCESS

This application is a continuation of application Ser. No. 145,406, filed Jan. 19, 1988 now abandoned.

This invention relates to the removal of phosphine residues from a solution of a hydrogenated polymer.

BACKGROUND

The hydrogenation of unsaturated polymers is very well known. In many polymer hydrogenation processes, a homogeneous, transition metal complex is used as a hydrogenation catalyst. The efficiency of the catalyst, particularly if it contains rhodium or ruthenium, may be improved by the presence of certain phosphine molecules. For example, U.K. 1,558,491 teaches the selective hydrogenation of unsaturated polymers, using a rhodium-based catalyst. The examples of this patent also illustrate that the catalyst is effectively used in the presence of 10 parts by weight of additional triphenyl phosphine per 100 parts of polymer. After the hydrogenation process, the hydrogenated polymer is recovered from the solution. However, because phosphine has a certain affinity for the hydrogenated polymer, the use of the phosphine can cause phosphine residues in the recovered hydrogenated polymer. Furthermore, there is some indication that phosphines cause problems with polymer vulcanization.

Thus, it is known that the use of additional phosphine can improve the efficiency of certain polymer hydrogenation catalysts, but a cost associated with this use is the deposition of phosphine residues in the hydrogenated polymer. Since there is a strong desire to maximize catalyst efficiency, for reasons which include process economy and product purity, there is a resulting need for a process to remove phosphine from the hydrogenated polymer solution.

It is an object of the present invention to provide a process for treating a solution which contains a hydrogenated polymer and a phosphine residue.

The present invention provides a process for treating a solution containing a hydrogenated polymer and a phosphine residue, the process comprising:
i) forming a phosphine-derived precipitate by adding to the solution an organo-halide reagent of the formula R—X where R is selected from phenoxy, $C_{1-10}$ alkyl, $C_{1-10}$ alkoxy, allyl and ara-alkyl, X is selected from bromine, chlorine and iodine, and
ii) mechanically removing the precipitate.

DETAILED DESCRIPTION

The process of the present invention is applicable to solutions which contain a hydrogenated polymer and which also contain a phosphine residue. The hydrogenated polymer is produced by catalytically hydrogenating an unsaturated base polymer. Among the unsaturated base polymers which may be hydrogenated are polybutadiene homopolymer, random styrene-butadiene copolymer, styrene-butadiene block copolymer and nitrile rubber. The term "nitrile rubber" as used herein refers to a rubbery copolymer of a $C_{4-6}$ conjugated diene and a $C_{3-5}$ $\alpha,\beta$ unsaturated nitrile, and optionally, a minor amount of a third co-polymerizable monomer such as a carboxylic acid or a monolefin such as an acrylate. Examples of such nitrile rubbers include acrylonitrile-butadiene rubber, acrylonitrile-isoprene rubber, and acrylonitrile-butadiene-methacrylic acid rubber. All of the unsaturated base polymers listed above, and methods of their preparation, are well known to those skilled in the art.

Initially, the unsaturated base polymer is added to a solvent, and stirred until the polymer is substantially dissolved. Examples of suitable solvents include aryl hydrocarbons and their alkyl and halo derivatives, such as benzene, toluene, xylene, chloroform dichlorobenzene and monochlorobenzene, or aliphatic ethers such as tetrahydrofuran, or ketones such as acetone, cyclohexanone methylethylketone.

The catalyst and phosphine are then added to the polymer solution prior to the introduction of hydrogen. Further detailed descriptions of illustrative polymer hydrogenation processes which utilize phosphine are given in U.S. Pat. No. 4,464,515 and U.K. 1,558,491. The efficiency of the polymer hydrogenation catalyst that is used in these hydrogenation processes may be enhanced by the use of an additional amount of a phosphine compound. Suitable examples of the phosphine compounds include trimethyl phosphine, triethyl phosphine and triphenyl phosphine. Triphenyl phosphine is normally preferred. Thus, when the hydrogenation process is completed, the solution contains hydrogenated polymer and phosphine. The present invention is directed only to the treatment of solutions which contain both a hydrogenated polymer and a phosphine residue. As disclosed in U.K. 1,558,491, the phosphine may be present in an amount up to 25 weight percent, based on the hydrogenated polymer.

The process of the present invention utilizes an organo-halide reagent of the formula R—X where R is phenoxy, $C_{1-10}$ alkyl, $C_{1-10}$ alkoxy, allyl or ara-alkyl and where X is bromine, chlorine or iodine. The term ara-alkyl refers to an aryl which is substituted with a $C_{1-4}$ alkyl group.

The organo-halide reagent is contacted with the phosphine contaminated polymer solution by adding the reagent to the solution. After sufficient contact time, an insoluble phosphine-derived precipitate is formed. While not wishing to be bound by any theories, it is believed that this insoluble precipitate is essentially a quaternary phosphonium salt.

The process of the present invention is normally completed at temperatures between 0° and 200° C. and gauge pressures between 0.1 and 20 atmospheres. It is preferred to initially contact the polymer solution with the organo-halide reagent at a temperature between 100° and 120° C. and a gauge pressure between 1 and 4 atmospheres. Higher temperatures and pressures may be used, but are not required.

The organo-halide reagent is contacted with the solution containing the hydrogenated polymer and phosphine for a time period of between several minutes and 10 to 20 hours. A contact time of between 4 and 8 hours is especially preferred. The solution should be stirred during the contact time, to help ensure good mixing of the reagent and solution.

It is preferred to cool the solution to about 20° to 40° C. after a contact time of 4 to 6 hours, to assist with the precipitation of the phosphine residue. The amount of the organo-halide reagent which is added to the polymer solution will normally depend upon the amount of phosphine which is present in the solution. The phosphine apparently reacts with the reagent on an approximately equimolar basis. Therefore, the reagent is preferably added to the solution in at least an equimolar amount with respect to the phosphine. However, the use of a molar excess of reagent may assist the present process, particularly when R contains less than 6 C atoms. A molar excess of up to 15 times the amount of phosphine is suitable when R is, for example $C_2$. When R is benzyl, it is preferred to use an approximately equamolar amount of reagent R—X with respect to the phosphine.

It has been discovered that the type of organo-halide reagent which is used has some effect on the particle size of the resulting precipitate. It is preferred to produce relatively large precipitate particles, so as to facilitate the subsequent removal of the precipitate from the polymer solution. Benzyl bromide and benzyl chloride have been discovered to produce particularly large precipitate particles, and are therefore especially preferred reagents for use in the process of the present invention.

The precipitate is mechanically removed from the polymer solution. The term "mechanically removed" is meant to refer to any of the suitable physical separation techniques known to a skilled engineer, such as filtration or centrifugation.

Further details of the present invention are illustrated by the following, non-limiting examples.

EXAMPLE 1

This example illustrates a known polymer hydrogenation process.

45 grams of an acrylonitrile-butadiene copolymer and 750 mls of monochlorobenzene were added to a stainless steel autoclave, and several minutes were allowed for the copolymer to dissolve. A partial vacuum was then drawn on the autoclave, followed by an argon purge. A second vacuum was then drawn on the autoclave.

In a separate glass flask, 0.04 grams of $HRh(PPh_3)_4$ and 2.7 g of additional triphenyl phosphine were mixed. A partial vacuum was drawn on the flask, followed by an argon purge. The catalyst and triphenyl phosphine were then introduced into the autoclave. Thus, the amount of additional triphenyl phosphine corresponded to a concentration of approximately 5.5 grams per 100 grams of rubber.

The autoclave was heated to a temperature of approximately 130° C. and hydrogen was added until the pressure reached approximately 600 p.s.i. The hydrogenation reaction proceeded for a period of 12 hours, yielding a phosphine contaminated, polymer cement. A small sample of the cement was coagulated with methanol, and the recovered polymer was dried in a vacuum flask. Infrared analysis indicated that over 99% of the original carbon-carbon double bonds had been hydrogenated.

EXAMPLE 2

A monochlorobenzene solution of hydrogenated acrylonitrile-butadiene rubber was prepared according to the procedure described in Example 1. The amount of additional triphenylphosphine which was employed corresponded to about 5.5 grams per 100 grams of unsaturated base polymer.

After the hydrogenation process, a second triphenyl phosphine solution, containing 2 grams of triphenyl phosphine per 100 mls of monochlorobenzene, was prepared in a separate glass flask. The hydrogenated rubber solution was then mixed with further triphenyl phosphine by adding 100 mls of the second triphenyl phosphine solution with 100 mls of the hydrogenated polymer solution in a glass flask. Thus, the solution contained the triphenyl phosphine which was used in the hydrogenation process plus a further "spike" of triphenyl phosphine.

The glass flask was placed on a heating element and fitted with a reflux condensor. An organo-halide reagent was then added to the flask. The resulting mixture was refluxed for between 4 and 5 hours at the vapour pressure of the reaction and a temperature of 110° C. The flask was cooled to about room temperature, resulting in the formation of a precipitate. The precipitate was then filtered from the solution and weighed. The type and amount of organo-halide reagent, and the amount of resulting precipitate, are shown in Table 1.

TABLE 1

| Experiment | Reagent | Amount Reagent | Added $PPh_3$ | Precipitate (g) |
|---|---|---|---|---|
| 1 | $CH_3Br$ | 4 ml | 2 g | 3.2 g |
| 2 | $C_2H_5Br$ | 3 ml | 2 g | 3.7 g |

EXAMPLE 3

Using the procedure as generally described in Example 1, a solution having a base rubber concentration of about 10.5 grams of acrylonitrile-butadiene rubber per 100 mls of monochlorobenzene was hydrogenated. The amount of triphenyl phosphine which was used in the hydrogenation reaction was approximately 5.5 grams per 100 grams of rubber. 130 ml of the hydrogenated rubber solution was added to a glass flask and the glass flask was then agitated in a laboratory shaker machine.

The solution was then diluted with 300 ml of monochlorobenzene, and an organo-halide reagent (as indicated in Table 2) was added to the diluted solution. The resulting solution was refluxed at 130° C. for approximately 6 hours and then cooled to room temperature. A dense precipitate was observed at the bottom of the glass flask. The mixture was then decanted, and a sample was collected from the top. The sample was dried under vacuum to recover the polymer.

In addition, a comparative experiment was completed in which the polymer solution was refluxed for 6 hours at 130° C. without any organo-halide reagent being added.

The recovered polymers from each experiment were then extracted with chloroform. The extract was dried, then redissolved in methanol. The methanol solution was injected into a calibrated liquid chromatograph for analysis of triphenyl phosphine and triphenyl phosphine oxide. The measured amounts of triphenyl phosphine and triphenyl phosphine oxide are shown in Table 2.

As shown in Table 2, the recovered polymer from the comparative experiment contained about 1.33 weight percent triphenyl phosphine and 2.17 weight percent triphenyl phosphine oxide. In comparison, the recovered polymer from experiment 3-2 contained no detectable triphenyl phosphine, and a triphenyl phosphine oxide concentration of 0.94 weight percent.

TABLE 2

| Experiment | Reagent | Amount Reagent | wt. % triphenyl-phosphine | wt. % triphenyl-oxide |
|---|---|---|---|---|
| 3-1 | $C_2H_5Br$ | 1.5 ml | 0.75 | 1.41 |
| 3-2 | benzyl bromide | 1.5 ml | none detected | 0.94 |
| 3-3 (control) | — | 0 | 1.33 | 2.17 |

EXAMPLE 4

Using the hydrogenation process as generally described in Example 1, a solution containing a partially hydrogenated acrylonitrile-butadiene rubber and a phosphine residue was prepared. A solution containing about 12 grams of partially hydrogenated acrylonitrile-butadiene rubber and about 0.7 grams of triphenylphosphine in 600 mls of monochlorobenzene was added to a 1000 ml round bottom flask. The flask was fitted with a heater, an agitator and a reflux condensor.

A reagent (as shown in Table 3) was added to the solution. The solution was stirred and refluxed for 8 hours, after which it was allowed to cool overnight. Five grams of a filter aid were then added to the system. The precipitate was readily filtered by a #42 Whatman ® filter.

TABLE 3

| Experiment | Reagent | Amount Reagent |
|---|---|---|
| 4-1 | Iodoheptane | 3.0 ml |
| 4-2 | Di iodopentane | 3.0 ml |

EXAMPLE 5

Using the hydrogenation process as generally described in Example 1, but on a larger scale, a solution containing partially hydrogenated acrylonitrile-butadiene rubber and phosphine was prepared.

The concentration of the rubber in monochlorobenzene was increased to 9 weight percent for the hydrogenation reaction. The amount of triphenyl phosphine which was used in the hydrogenation process was about 0.52 g per 100 ml of solution.

About 140 l of the above partially hydrogenated acrylonitrile butadiene rubber solution was diluted with approximately 50 l of monochlorobenzene. In a separate container, about 450 g of benzyl bromide was added to about 10 l of monochlorobenzene.

The benzyl bromide mixture was then added to the rubber solution, and the resulting mixture was heated for 9 hours at a temperature which fluctuated between 100° and 115° C. The mixture was then cooled to about 31° C., and a dense precipitate was observed. The polymer-containing mixture was added to a centrifuge for the removal of the dense precipitate. The centrifuge was operated at a speed of approximately 8500 revolutions per minute.

Samples of the discharge material were analyzed by liquid chromatography and found to contain a phosphine residue.

In addition, hydrogenated polymer was recovered from solution and analyzed according to the procedure described in Example 3. The treated polymer was found to contain less than 0.2 weight percent triphenyl phosphine.

EXAMPLE 6

Using the hydrogenation process as generally described in Example 1, but on a larger scale, a monochlorobenzene solution containing partially hydrogenated acrylonitrile-butadiene rubber and triphenylphosphine was prepared. The rubber concentration was 7.5 weight percent. Triphenyl phosphine was used in an amount equal to approximately 0.52 g per 100 ml of solution.

160 grams of benzyl chloride, dissolved in approximately 4.5 l of monochlorobenzene, was added to approximately 140 l of the above rubber solution. The solution was agitated and heated for 12 hours at a temperature which varied from 73° C. to 116° C. The mixture was then cooled to about 28° C., and a precipitate was observed. The polymer-containing mixture was then added to a centrifuge for removal of the precipitate. The centrifuge readily separated the precipitate, at an operating speed of approximately 8500 revolutions per minute.

What is claimed is:

1. A process for treating a solution containing a hydrogenated polymer and a phosphine residue, said process comprising:
   i) forming a phosphine-derived precipitate by adding to said solution an organo-halide reagent of the formula R—X where R is selected from $C_{1-10}$ alkyl, $C_{1-10}$ alkoxy, phenoxy, allyl and ara-alkyl; and X is selected from bromine, chlorine and iodine, and
   ii) mechanically removing said precipitate.

2. The process of claim 1 wherein said reagent is added to said solution on an approximately equimolar basis with respect to said phosphine.

3. The process of claim 1 wherein said precipitate is mechanically removed by centrifugation.

4. The process of claim 1 wherein said organo-halide reagent is benzyl bromide.

5. The process of claim 1 wherein said organo-halide reagent is benzyl chloride.

6. The process of claim 1 wherein said solution comprises a monochlorobenzene solution of a hydrogenated acrylonitrile-butadiene rubber.

7. The process of claim 1 wherein said phosphine comprises triphenyl phosphine.

8. A process for treating a solution containing a hydrogenated acrylonitrile-butadiene rubber and a triphenylphosphine residue, said process comprising:
   A) forming a phosphine-derived precipitate by
      i) adding benzyl bromide to said solution,
      ii) heating said solution, with agitation, to a temperature of between 70° C. and 120° C. for between 4 and 8 hours,
      iii) cooling said solution and said precipitate to a temperature of between 20° C. and 40° C., and
   B) mechanically removing said precipitate by centrifugation.

* * * * *